United States Patent
Wu

(10) Patent No.: US 11,242,202 B2
(45) Date of Patent: Feb. 8, 2022

(54) FREEZING SPIRAL NET CHAIN STRUCTURE

(71) Applicant: YANGZHOU WELDON TRANSMISSION EQUIPMENT CO., LTD., Yangzhou (CN)

(72) Inventor: Baodong Wu, Yangzhou (CN)

(73) Assignee: YANGZHOU WELDON TRANSMISSION EQUIPMENT CO., LTD., Yangzhou (CN)

( * ) Notice: Subject to any disclaimer, the term of this patent is extended or adjusted under 35 U.S.C. 154(b) by 0 days.

(21) Appl. No.: 17/270,456

(22) PCT Filed: Aug. 15, 2019

(86) PCT No.: PCT/CN2019/100718
§ 371 (c)(1),
(2) Date: Feb. 23, 2021

(87) PCT Pub. No.: WO2020/191994
PCT Pub. Date: Oct. 1, 2020

(65) Prior Publication Data
US 2021/0253359 A1    Aug. 19, 2021

(30) Foreign Application Priority Data

Mar. 28, 2019  (CN) .......................... 201920403994.X
Jul. 23, 2019   (CN) .......................... 201910667870.7

(51) Int. Cl.
*B65G 17/40*     (2006.01)
*B65G 17/08*     (2006.01)
*F25D 25/04*     (2006.01)

(52) U.S. Cl.
CPC ........... *B65G 17/40* (2013.01); *B65G 17/086* (2013.01); *F25D 25/04* (2013.01);
(Continued)

(58) Field of Classification Search
CPC ........ B65G 21/18; B65G 17/40; B65G 17/86; B65G 2207/24; B65G 2812/02396; B65G 2812/02356; F25D 25/04
(Continued)

(56) References Cited

U.S. PATENT DOCUMENTS 4,940,133 A * 7/1990 Roinestad ............ B65G 17/064
                                                            198/778
7,762,388 B2 * 7/2010 Lago .................... B65G 17/063
                                                            198/834
(Continued)

FOREIGN PATENT DOCUMENTS

CN    101341082 A    1/2009
CN    102196974 A    9/2011
(Continued)

*Primary Examiner* — James R Bidwell
(74) *Attorney, Agent, or Firm* — Bayramoglu Law Offices LLC

(57) ABSTRACT

A freezing spiral net chain structure includes a plurality of chain links successively arranged in a travelling direction of a rail. Transmission teeth are arranged at inner ends of the chain links. Engagement teeth are arranged at two sides of the chain links. The engagement teeth of the adjacent chain links are engaged with each other. Axial holes are disposed between the mutually engaged engagement teeth. Rotary shafts are inserted into the axial holes. A metal piece is connected between outer ends of every two adjacent rotary shafts. The metal piece may bear a load from an outer-end spiral net, and since a coefficient of expansion of metal is smaller than that of plastic, deformation between the adjacent rotary shafts as a result of cold shrinking is reduced. The metal piece is different from the rotary shafts of the plastic spiral conveying net chain in terms of pitch.

15 Claims, 2 Drawing Sheets

(52) U.S. Cl.
CPC .................. *B65G 2207/24* (2013.01); *B65G 2812/02356* (2013.01); *B65G 2812/02396* (2013.01)

(58) Field of Classification Search
USPC ........................................................ 198/778
See application file for complete search history.

(56) References Cited

U.S. PATENT DOCUMENTS

| | | | | |
|---|---|---|---|---|
| 8,302,765 | B2 * | 11/2012 | Lago .................. | B65G 17/086 |
| | | | | 198/778 |
| 8,453,827 | B2 * | 6/2013 | Corley ................ | B65G 17/086 |
| | | | | 198/778 |
| 2006/0266623 | A1 * | 11/2006 | Heber ................. | B65G 17/064 |
| | | | | 198/778 |
| 2015/0191312 | A1 | 7/2015 | Ulchak et al. | |

FOREIGN PATENT DOCUMENTS

| | | |
|---|---|---|
| CN | 102910414 A | 2/2013 |
| CN | 109319391 A | 2/2019 |
| EP | 3369681 A1 | 9/2018 |
| JP | 2019031372 A | 2/2019 |

* cited by examiner

FREEZING SPIRAL NET CHAIN STRUCTURE

CROSS REFERENCE TO THE RELATED APPLICATIONS

This application is the national phase entry of International Application No. PCT/CN2019/100718, filed on Aug. 15, 2019, which is based upon and claims priority to Chinese Patent Application No. 201920403994.X, filed on Mar. 28, 2019; and Chinese Patent Application No. 201910667870.7, filed on Jul. 23, 2019, the entire contents of which are incorporated herein by reference.

TECHNICAL FIELD

Embodiments of this application relate to the technical field of conveying devices, and in particular, to a freezing spiral net chain structure.

BACKGROUND

A spiral net chain has a light weight, a wide heat conduction range, and a large conveying capacity. When an existing spiral network chain structure is used in a spiral tower in the refrigeration industry, a spiral network chain may shrink and tension after entering the freezing spiral tower due to an expansion and contraction characteristic of a plastic material, causing the spiral network chain to break, which seriously affects a service life and a conveying effect.

SUMMARY

To this end, embodiments of this application provide a freezing spiral net chain structure, to resolve the problem that a spiral network chain breaks as a result of shrinkage and tensioning of the spiral network chain after entering a freezing spiral tower due to an expansion and contraction characteristic of a plastic material.

To achieve the foregoing objective, the embodiments of this application provide the following technical solution:

According to the embodiments of this application, a freezing spiral net chain structure is provided, including a plurality of chain links successively arranged in a travelling direction of a rail. Transmission teeth are arranged at inner ends of the chain links, and engagement teeth are arranged at two sides of the chain links; the engagement teeth of adjacent chain links are engaged with each other, and axial holes are disposed between the mutually engaged engagement teeth; rotary shafts are inserted into the axial holes, and a metal piece is connected between outer ends of every two adjacent rotary shafts.

Further, the metal piece is provided with two through holes sized to match diameters of the rotary shafts, and the metal piece is disposed on the two adjacent rotary shafts through the two through holes.

Further, outer ends of the rotary shafts form clearance fits with both sides of the axial holes of the corresponding engagement teeth.

Further, limiting portions configured to limit ends of the rotary shafts are integrally provided at outer ends of all of the chain links, each of the limiting portions is a square block, the square block is provided with a square hole, a limiting stop is provided in the square hole, and the metal piece is connected to the rotary shafts at an inner side of the limiting stop.

Further, the metal piece is made of stainless steel or aluminum alloy.

Further, the stainless steel is 304 stainless steel.

Further, the limiting stop is a round sheet or a square sheet.

Further, the metal piece has a symmetrical structure, and two protruding extension portions are provided at two ends of the metal piece in a length direction.

Further, the through holes are provided at centers of the extension portions, and the through holes are circular.

Further, diameters of the through holes are 1.05-1.25 times the diameters of the rotary shafts.

Further, the metal pieces may bear a load from a part of a spiral net, and since a coefficient of expansion of metal is smaller than that of plastic, deformation between the adjacent rotary shafts as a result of cold shrinking is restricted, thereby preventing a spiral conveying net chain from breaking in a freezing conveying tower at −40° C. due to shrinkage and tensioning.

Further, a pitch of the metal piece after freezing shrinkage is less than a pitch at a corresponding position on the plastic net chain after cold shrinking.

The embodiments of this application have the following advantages:

The metal pieces are added at an outer side of the freezing spiral net chain structure provided in the embodiments of this application. The metal pieces may bear a load from an outer end spiral net, and since a coefficient of expansion of metal is smaller than that of plastic, the deformation between the adjacent rotary shafts as a result of cold shrinking is reduced. The metal piece is different from the rotary shafts of the plastic spiral conveying net chain in terms of pitch, which results in a non-stressed state of the rotary shafts of the plastic net chain at a room temperature and −40° C., thereby preventing the spiral net chain from breaking due to shrinkage and tensioning. This design can effectively increase a service life of the spiral net chain in the freezing conveying tower at a room temperature and −40° C., and provide conveying stability.

BRIEF DESCRIPTION OF THE DRAWINGS

In order to more clearly describe the technical solutions in implementations of this application or in the prior art, the accompanying drawings for describing the implementations or the prior art are briefly described below. Apparently, the accompanying drawings in the following description are merely exemplary, and a person of ordinary skill in the art may further derive other implementation drawings from the provided accompanying drawings without creative efforts.

A structure, a scale, a size, and the like shown in this specification are merely for adapting to the contents disclosed in this specification for understanding and reading by a person skilled in the art, and are not intended to limit the implementation conditions of this application, which therefore have no substantial technical significance. Any modification, proportion change, or size adjustment to a structure shall still fall within the scope encompassed by the technical content disclosed in this application without affecting effects and purposes of this application.

In the figures: 1. Chain link; 2. Transmission tooth; 3. Engagement tooth; 4. Axial hole; 5. Rotary shaft; 6. Limiting portion; 61. Square hole; 62. Limiting stop; 7. Metal piece; 71. Through hole; 72. Extension portion.

DETAILED DESCRIPTION OF THE EMBODIMENTS

Implementations of this application are described below by using specific embodiments. A person skilled in the art can easily understand other advantages and effects of this application from the contents disclosed in this specification. Apparently, the described embodiments are some but not all embodiments of this application. All other embodiments obtained by a person of ordinary skill in the art based on the embodiments of this application without creative efforts shall fall within the protection scope of this application.

Figure 1:
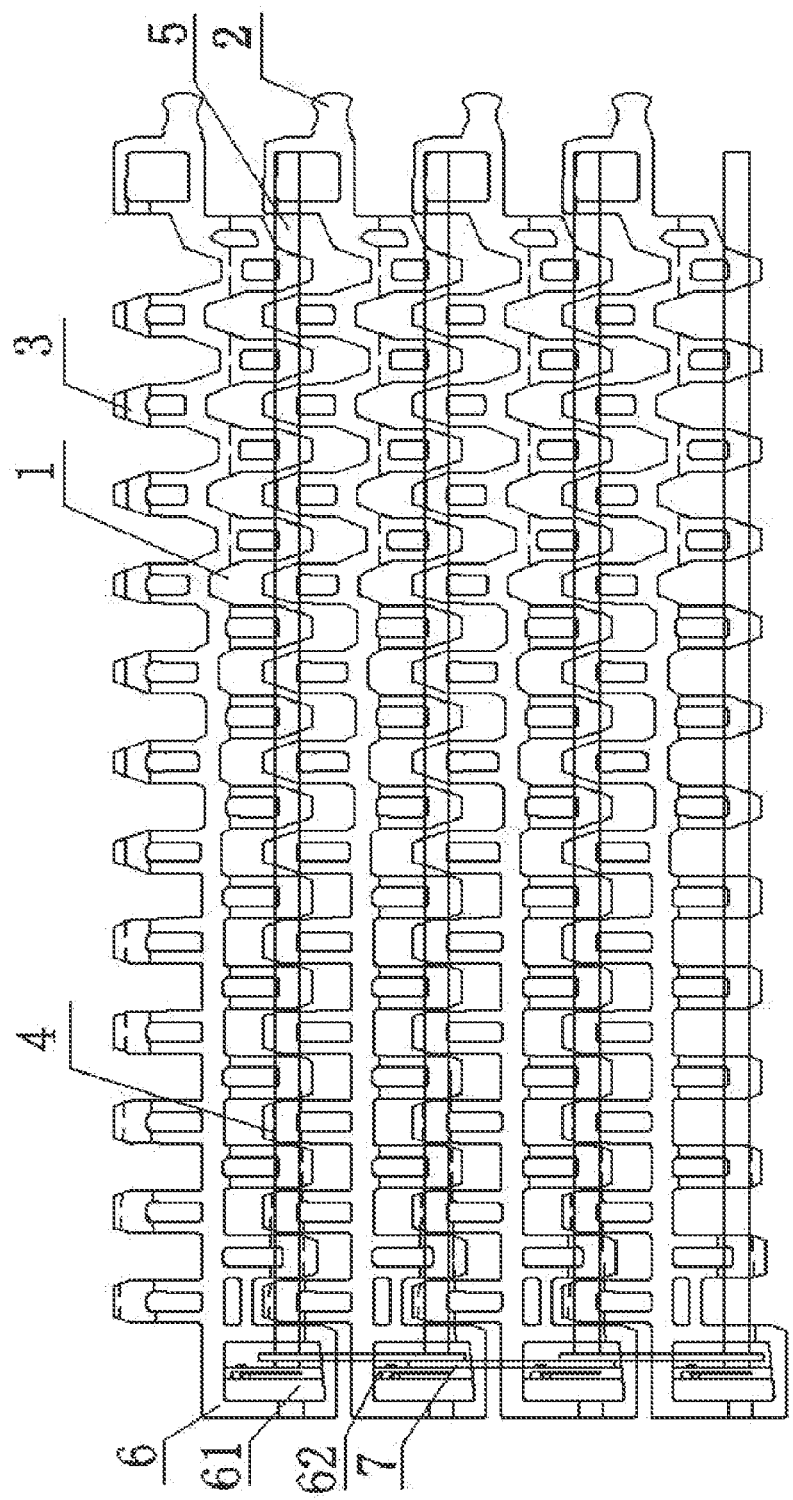
FIG. 1 is a schematic structural diagram of a freezing spiral net chain structure according to an exemplary embodiment.

According to the embodiments of this application, a freezing spiral net chain structure is provided. As shown in FIG. 1, the freezing spiral net chain structure includes a plurality of chain links 1 successively arranged in a travelling direction of a rail. Transmission teeth 2 are arranged at inner ends of the chain links 1, and engagement teeth 3 are arranged at two sides of the chain links 1. The engagement teeth 3 of adjacent chain links 1 are engaged with each other, and axial holes 4 are disposed between the mutually engaged engagement teeth 3. Rotary shafts 5 are inserted into the axial holes 4, and a metal piece 7 is connected between outer ends of every two adjacent rotary shafts 5.

The metal pieces 7 are added on an outer side of the freezing spiral net chain structure provided in the embodiments of this application. The metal pieces 7 may bear a load from a part of a spiral net, and since a coefficient of expansion of metal is smaller than that of plastic, deformation between the adjacent rotary shafts 5 as a result of cold shrinking is restricted, thereby preventing a spiral conveying net chain from breaking in a freezing conveying tower at −40° C. due to shrinkage and tensioning. This design can effectively increase a service life of the spiral net chain in the freezing conveying tower at −40° C., and provide conveying stability.

Figure 2:
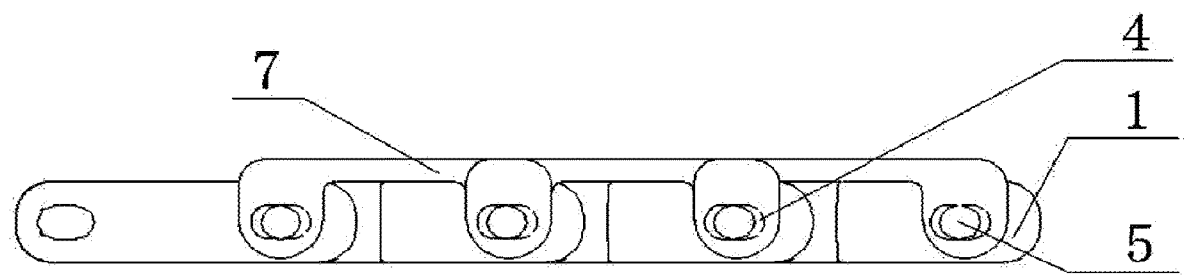
FIG. 2 is a schematic structural diagram in which an outer end of a rotary shaft is threaded in an axial hole according to an exemplary embodiment.

In some optional embodiments, there are a plurality of metal pieces 7. As shown in FIG. 2, the plurality of metal pieces 7 are stacked in an alternating manner, that is, in two adjacent metal pieces 7, a through hole 71 of a left metal piece 7 is sheathed on the same rotary shaft 5 as a through hole 71 of a right metal piece 7. However, rotary shafts 5 located at both ends of the net chain structure are not the case. Only one through hole 71 of the metal piece 7 is sheathed on the rotary shafts 5 located at the ends. There are three metal pieces 7 in FIG. 2, and only one through hole 71 is sheathed on the rotary shafts 5 at both ends.

Figure 3:
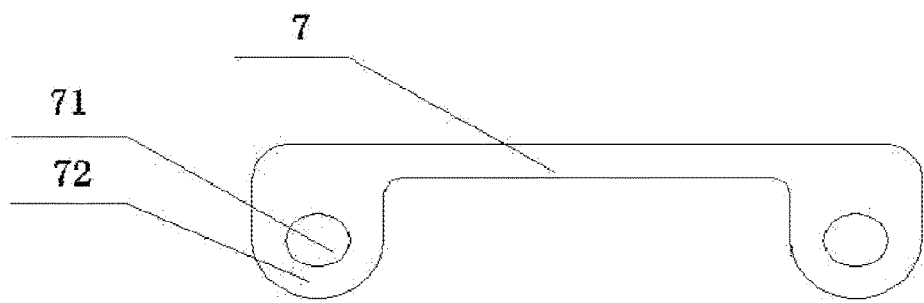
FIG. 3 is a schematic structural diagram of a metal piece according to an exemplary embodiment.

In some optional embodiments, as shown in FIG. 3, the metal piece 7 is provided with two through holes 71 sized to match diameters of rotary shafts 5. The metal piece 7 is disposed on the two adjacent rotary shafts 5 through the two through holes 71.

By disposing the through holes 71, cold shrinking deformation between adjacent rotary shafts 5 can be restricted, and the spiral net chain can be prevented from breaking as a result of shrinkage and tensioning in the freezing tower at −40° C.

In some optional embodiments, outer ends of the rotary shafts 5 form clearance fits with both sides of the axial holes 4 of the corresponding engagement teeth 3. After the entire structure is in the freezing tower, shrinkage allowance is reserved for expansion and contraction, to further prevent the spiral net chain from breaking.

In some optional embodiments, limiting portions 6 configured to limit ends of the rotary shafts 5 are integrally provided at outer ends of all of the chain links 1, each of the limiting portions 6 is a square block, the square block is provided with a square hole 61, a limiting stop 62 is provided in the square hole 61, and the metal piece 7 is connected to rotary shafts 5 at an inner side of the limiting stop 62.

By disposing the limiting stop 62, a position of the metal piece 7 can be defined, thus preventing the metal piece 7 from falling off the rotary shaft 5.

In some optional embodiments, the metal piece 7 is made of stainless steel or aluminum alloy.

The metal piece 7 has good mechanical properties at a low temperature. Stainless steel or aluminum alloy can meet some properties and has strong corrosion resistance and good rust prevention.

In some optional embodiments, the stainless steel is 304 stainless steel.

The 304 stainless steel can operate at −192 degrees Celsius, and therefore is completely applicable in the freezing tower.

In some optional embodiments, the limiting stop 62 is a round sheet or a square sheet.

The limiting stop 62 is designed as a round sheet or a square sheet to be completely put into the square hole 61. Certainly, the limiting stop 62 may also be designed into an irregular polygon shape, a pentagram shape, or the like.

In some optional embodiments, as shown in FIG. 3, the metal piece 7 is a symmetrical structure, and two protruding extension portions 72 are provided at two ends of the metal piece in a length direction.

By disposing the protruding extension portions 72, the metal piece 7 can be conveniently connected to the rotary shaft 5. An end of the extension portion 72 is semicircular.

In some optional embodiments, the through holes 71 are provided at centers of the extension portions 72, and the through holes 71 are circular. A shape of the through hole 71 is the same as a shape of the rotary shaft 5.

In the prior art, no metal piece 7 is disposed, and the rotary shaft 5 is tightly engaged with a plastic net chain so that the rotary shaft 5 restricts a pitch of the plastic net chain. However, due to expansion and contraction, the plastic net chain easily breaks as a result of excessive contraction or excessive tension after freezing of plastics, resulting in unexpected halt.

In this application, the metal piece 7 is used. There is a specific gap between the rotary shaft 5 of the plastic net chain and the plastic net chain, and the plastic net chain is tightly engaged with the metal piece 7 so that the metal piece 7 restricts the pitch of the plastic net chain. The chain link 1 does not restrict the pitch, and therefore the chain link 1 avoids excessive contraction or excessive tension.

In order to avoid a failure of the metal piece 7 to restrict the pitch of the plastic net chain, a pitch of the metal piece 7 after freezing shrinkage is less than a pitch at a corresponding position on the plastic net chain after cold shrinking. The pitch of the metal piece 7 refers to a distance between centers of the two through holes 71. A cold shrinking degree of the metal piece 7 at a low temperature is lower than that of plastic at the same temperature. The metal piece 7 made of aluminum alloy or stainless steel can achieve the effect.

In some optional embodiments, diameters of the through holes 71 are 1.05-1.25 times the diameters of the rotary shafts 5.

By setting a proportional relationship between the diameter of the through hole 71 and the diameter of the rotary shaft 5, a failure of inserting the rotary shaft 5 into the through hole 71 can be avoided, and difficulty of connection between the rotary shaft and the through hole due to an excessive diameter of the through hole 71 can also be avoided.

The metal piece 7 is added at an outer end of the freezing spiral net chain structure provided in the embodiments of this application. The metal piece 7 may bear a load from an outer end spiral net, and since a coefficient of expansion of metal is smaller than that of plastic, deformation between the adjacent rotary shafts 5 as a result of cold shrinking is reduced. Due to a difference between the metal piece 7 and the rotary shafts 5 of the plastic net chain in terms of pitch, that is, the pitch of the metal piece 7 after cold shrinking being less than the pitch at the corresponding position on the plastic net chain after cold shrinking, the rotary shafts 5 of the plastic spiral conveying net chain are in a non-stressed state in a freezing conveying tower at a room temperature and −40° C., thereby preventing the spiral net chain from breaking due to shrinkage and tensioning. This design can effectively increase the service life of the spiral net chain in the freezing conveying tower at a room temperature and −40° C., and provide conveying stability.

Although this application is described in detail above by using the general description and specific embodiments, some modifications or improvements may be made on the basis of this application, which is obvious to a person skilled in the art. Therefore, the modifications or improvements made without departing from the spirit of this application all fall within the protection scope of the claims of this application.

What is claimed is:

1. A freezing spiral net chain structure, comprising:
   a plurality of chain links; wherein
   the plurality of chain links are successively arranged in a travelling direction of a rail, wherein transmission teeth are arranged at inner ends of the plurality of chain links, and engagement teeth are arranged at two sides of each of the plurality of chain links, wherein engagement teeth of adjacent chain links of the plurality of chain links are engaged with each other, axial holes are disposed between the engagement teeth of the adjacent chain links, and a plurality of rotary shafts are inserted into the axial holes, wherein a metal piece is connected between outer ends of two adjacent rotary shafts of the plurality of rotary shafts,
   limiting portions configured to limit ends of the plurality of rotary shafts are integrally provided at outer ends of the plurality of chain links, each of the limiting portions is a square block, the square block is provided with a square hole, a limiting stop is provided in the square hole, and the metal piece is connected to the two adjacent rotary shafts at an inner side of the limiting stop.

2. The freezing spiral net chain structure according to claim 1, wherein
   the metal piece is made of a stainless steel or an aluminum alloy.

3. The freezing spiral net chain structure according to claim 1, wherein
   the limiting stop is a round sheet or a square sheet.

4. The freezing spiral net chain structure according to claim 1, wherein
   the outer ends of the two adjacent rotary shafts form clearance fits with both sides of each of the axial holes of the engagement teeth of the adjacent chain links.

5. The freezing spiral net chain structure according to claim 4, wherein
   the metal piece is made of a stainless steel or an aluminum alloy.

6. The freezing spiral net chain structure according to claim 5, wherein
   the stainless steel is 304 stainless steel.

7. The freezing spiral net chain structure according to claim 1, wherein
   the metal piece is provided with two through holes sized to match a diameter of each of the plurality of rotary shafts, and the metal piece is disposed on the two adjacent rotary shafts through the two through holes.

8. The freezing spiral net chain structure according to claim 7, wherein
   the metal piece has a symmetrical structure, and two protruding extension portions are provided at two ends of the metal piece in a length direction.

9. The freezing spiral net chain structure according to claim 8, wherein
   the two through holes are provided at centers of the two protruding extension portions, and the two through holes are circular.

10. The freezing spiral net chain structure according to claim 9, wherein
    a diameter of each of the two through holes is 1.05-1.25 times the diameter of each of the plurality of rotary shafts.

11. The freezing spiral net chain structure according to claim 7, wherein
    the metal piece is made of a stainless steel or an aluminum alloy.

12. The freezing spiral net chain structure according to claim 11, wherein
    the stainless steel is 304 stainless steel.

13. The freezing spiral net chain structure according to claim 1, wherein
    the metal piece bears a load from a part of a plastic spiral conveying net chain, and a coefficient of expansion of the metal piece is smaller than a coefficient of expansion of the plastic spiral conveying net chain, to restrict a deformation between the two adjacent rotary shafts caused by cold shrinking and to prevent the plastic spiral conveying net chain from breaking in a freezing conveying tower at −40° C. due to shrinkage and tensioning.

14. A freezing spiral net chain structure, comprising:
    a plurality of chain links; wherein
    the plurality of chain links are successively arranged in a travelling direction of a rail, wherein transmission teeth are arranged at inner ends of the plurality of chain links, and engagement teeth are arranged at two sides of each of the plurality of chain links, wherein engagement teeth of adjacent chain links of the plurality of chain links are engaged with each other, axial holes are disposed between the engagement teeth of the adjacent chain links, and a plurality of rotary shafts are inserted into the axial holes, wherein a metal piece is connected between outer ends of two adjacent rotary shafts of the plurality of rotary shafts,
    the metal piece is made of a stainless steel or an aluminum alloy, and
    the stainless steel is 304 stainless steel.

15. A freezing spiral net chain structure, comprising:
a plurality of chain links; wherein
the plurality of chain links are successively arranged in a travelling direction of a rail, wherein transmission teeth are arranged at inner ends of the plurality of chain links, and engagement teeth are arranged at two sides of each of the plurality of chain links, wherein engagement teeth of adjacent chain links of the plurality of chain links are engaged with each other, axial holes are disposed between the engagement teeth of the adjacent chain links, and a plurality of rotary shafts are inserted into the axial holes, wherein a metal piece is connected between outer ends of two adjacent rotary shafts of the plurality of rotary shafts,
a pitch of the metal piece after freezing shrinkage is less than a pitch at a position corresponding to the metal piece on a plastic spiral conveying net chain after cold shrinking.

* * * * *